United States Patent
Tsukasaki (10) Patent No.: US 7,416,264 B2
(45) Date of Patent: Aug. 26, 2008

(54) VEHICLE STEERING APPARATUS AND VEHICLE STEERING METHOD

(75) Inventor: Yuichiro Tsukasaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 179 days.

(21) Appl. No.: 11/148,334

(22) Filed: Jun. 9, 2005

(65) Prior Publication Data

US 2005/0275283 A1  Dec. 15, 2005

(30) Foreign Application Priority Data

Jun. 14, 2004  (JP) .............................. 2004-175241

(51) Int. Cl.
*B60T 8/62* (2006.01)
(52) U.S. Cl. ...................... 303/189; 180/402; 280/5.52; 280/86.758
(58) Field of Classification Search ................ 303/155, 303/189, 191; 180/402, 410; 701/41; 280/5.52, 280/5.522, 86.758
See application file for complete search history.

(56) References Cited

U.S. PATENT DOCUMENTS

| 4,786,066 A | * | 11/1988 | Kondo et al. ................. 180/415 |
| 4,811,969 A | * | 3/1989 | Sugiyama ................. 280/5.522 |
| 4,902,032 A | * | 2/1990 | Krehan et al. ............. 280/5.523 |
| 6,345,869 B1 | * | 2/2002 | Matsuo et al. ........... 303/116.1 |
| 6,651,518 B1 | | 11/2003 | Osao |
| 6,719,087 B2 | * | 4/2004 | Demerly ...................... 180/402 |
| 2005/0012501 A1 | | 1/2005 | Isono et al. |

FOREIGN PATENT DOCUMENTS

| DE | 10121319 | 11/2002 |
| JP | 4-331336 | 11/1992 |
| JP | 6-312613 | 11/1994 |
| JP | 9-221019 | 8/1997 |
| JP | 10-218008 | 8/1998 |
| JP | 2002-22579 | 1/2002 |
| JP | 2002-39744 | 2/2002 |
| JP | 2003-104139 | 4/2003 |

* cited by examiner

*Primary Examiner*—Robert A. Siconolfi
*Assistant Examiner*—Mariano Sy
(74) *Attorney, Agent, or Firm*—Smith, Gambrell & Russell, LLP (57) ABSTRACT

A wheel adjusting device can adjust separately the wheel angles of left and right wheels. A judgment portion which determines whether vehicle braking is to be permitted or not based on the driving state of the vehicle. A control portion controls the wheel adjusting device. More specifically, under conditions where the vehicle braking is permitted by the judgment portion, the control portion defines the wheel angles of the left and right wheels to be in opposite phase and adjusts the wheel angles in accordance with the braking force to be applied to the left and right wheels.

21 Claims, 4 Drawing Sheets

VEHICLE STEERING APPARATUS AND VEHICLE STEERING METHOD

CROSS REFERENCE TO RELATED APPLICATIONS

The disclosure of Japanese Application No. 2004-175241 filed on Jun. 14, 2004 including the specification, drawings and abstract is incorporated herein by reference in its entirety.

BACKGROUND OF THE INVENTION

1. Field of the Invention

The present invention relates to a vehicle steering apparatus and method.

2. Description of the Related Art

For example, German Patent Application Laid-Open No. 10121319 discloses an emergency braking apparatus for applying a braking force to wheels by controlling the angle of left and right wheels to be in opposite phase (opposite direction) when the brake system has a problem or when its function is limited. However, there are also normal brake systems for this purpose, such as JP-A-09-221019 which discloses an anti-lock brake system (ABS) for preventing wheels of a general brake from being locked during a braking operation in order to reduce the braking distance and/or braking time.

However, German Patent Application Laid-Open No. 10121319 does not specifically disclose how a braking force can be obtained effectively by controlling the angle of wheels in order to reduce the braking distance and/or braking time, though it does disclose the control of the angle of the wheels to be of opposite phase. Furthermore, a brake apparatus may disadvantageously cause a longer braking distance and/or braking time, for example when an anti-lock brake is activated while the vehicle on a graveled road.

SUMMARY OF THE INVENTION

Accordingly, it is an object of the present invention to provide an inventive steering apparatus including a vehicle braking function.

It is another object of the present invention to reduce a braking distance and braking time during vehicle braking.

In order to achieve the objects, according to a first aspect of the invention, there is provided a vehicle steering apparatus. The vehicle steering apparatus includes a driving state detecting device for detecting a driving state of the vehicle, a wheel adjusting device for adjusting separately the wheel angles of left and right wheels, a judgment portion for determineing whether vehicle braking is to be permitted or not based on the driving state of the vehicle, and a control portion controlling the wheel adjusting device.

The control portion defines the wheel angles of the left and right wheels to be in opposite phase on condition that the vehicle braking is permitted by the judgment portion, and adjustably defines the wheel angles in accordance with the braking force to be applied to the left and right wheels.

In this case, according to the first aspect of the invention, the control portion preferably defines the wheel angles to be larger than the current value if the current braking force is larger than a previous braking force and preferably defines the wheel angles to be smaller than the current value if the current braking force is smaller than the previous braking force.

According to the first aspect of the invention, the vehicle steering apparatus preferably further includes a detecting portion which detects the deceleration of the vehicle. The control portion preferably estimates the braking force based on the deceleration of the vehicle. The vehicle steering apparatus may further include a detecting portion which directly detects the longitudinal force and lateral force acting on the wheels. The control portion may estimate the braking force based on the size of the friction circle of the wheels determined from the longitudinal force and lateral force. The vehicle steering apparatus may further include a detecting portion which directly detects the longitudinal force and lateral force acting on the wheels. The estimation portion may estimate the braking force based on the longitudinal force, lateral force and angle of wheels.

According to the first aspect of the invention, the control portion preferably defines the angle of wheels so that the left and right wheels are in the toe-in orientation.

According to a second aspect of the invention, there is provided a vehicle steering method. The vehicle steering method includes a first step of determining whether vehicle braking is to be permitted or not based on a driving state of the vehicle, and a second step of controlling the wheel angles of left and right wheels. The second step defines the wheel angles of the left and right wheels to be in opposite phase on condition that the vehicle braking is permitted, and adjustably defines the wheel angles in accordance with the braking force to be applied to the left and right wheels.

According to the second aspect of the invention, the second step preferably defines the wheel angles to be larger than the current value if the current braking force is larger than the previous braking force and preferably defines the wheel angles to be smaller than the current value if the current braking force is smaller than the previous braking force.

According to these aspects of the invention, left and right wheels can be controlled to be in opposite phase based on the driving state of the vehicle. Thus, the longitudinal component of a force with respect to a lateral force is applied to the left and right wheels as a braking force. Furthermore, in some cases, a resistive force due to the wheels being buried in a road is applied to the left and right wheels as another braking force. Thus, adoption of a different method from that of a normal brake apparatus can give a braking force to wheels and can therefore stop the vehicle effectively. Defining an angle of wheels adjustably in accordance with the braking force to be applied can effectively give the braking force to wheels, whereby more reduction of the braking distance and/or braking time can be achieved.

BRIEF DESCRIPTION OF THE DRAWINGS

FIG. 1 is an explanatory diagram of a vehicle applying a vehicle movement control equipment according to embodiments of the invention;

FIG. 2 is a block construction diagram showing a steering control apparatus;

FIG. 3 is an explanatory diagram of tire forces; and

FIG. 4 is a flowchart showing a steering control routine according to embodiments of the invention.

DESCRIPTION OF THE PREFERRED EMBODIMENTS

First Embodiment

FIG. 1 is an explanatory diagram of a vehicle applying a steering apparatus according to an embodiment. The vehicle is a four-wheel drive car which is driven through both the front and rear wheels. Power from a crank shaft (not shown) of an engine 1 is transmitted to drive shafts (wheel axles) 4 for the front and rear wheels through an automatic transmission 2 and a center differential apparatus 3. When power is transmitted to the axles 4, a rotational torque is applied to wheels 5, whereby a driving force in the wheels 5 is generated.

A steering apparatus 6 of the four-wheel drive car adopts a four-wheel steering mechanism which can independently control the angle of steering (angle of wheel) of each of the wheels 5 provided in the vehicle. According to this embodiment, the four-wheel steering mechanism is a steer-by-wire mechanism in which the wheels 5 and the steering wheel 7 are mechanically separated, so that the relationship between the angle of the steering wheel and an angle of steering of the front and rear left and right wheels 5 can be arbitrarily defined.

The steering wheel 7 turned by a driver is fixed to one end of a steering input axis 8. The other end of the steering input axis 8 is connected to a power transmission mechanism 9, and the output axis of a motor 10 is connected to the power transmission mechanism 9. Thus, power generated by the motor 10 is transmitted to the steering wheel 7 as steering reaction force T through the power transmission mechanism 9 and steering input axis 8.

Figure 1:
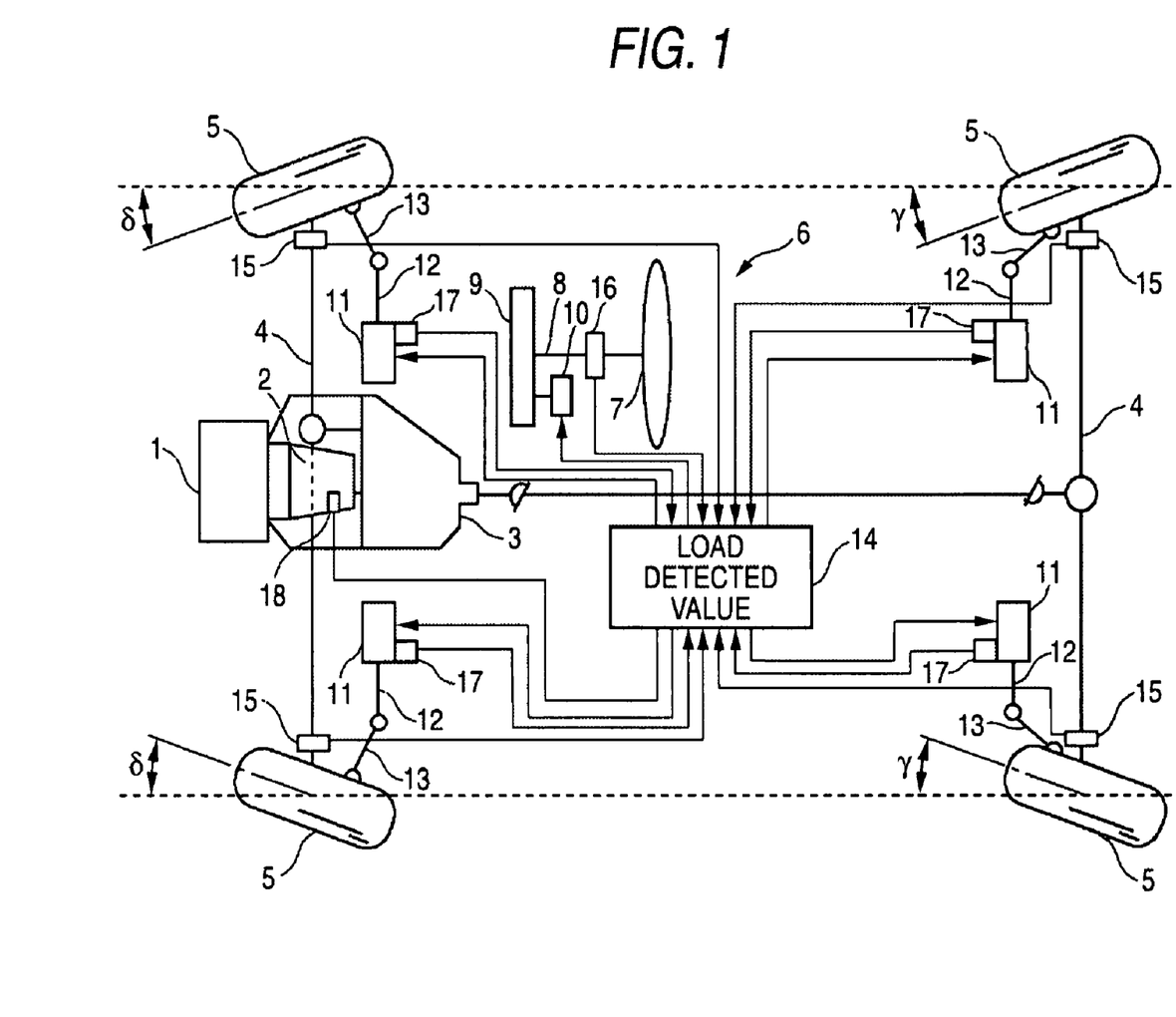

On the other hand, each of the wheels 5 has a steering actuator 11 serving as a wheel adjusting device. Thus, the angles of steering of the left and right front wheels 5 are adjusted independently by a pair of the steering actuators 11 on the front wheel side. The angles of steering of the left and right rear wheels 5 are adjusted independently by a pair of the steering actuators 11 on the rear wheel side. A drive rod 12 extends through each of the steering actuators 11, and the drive rod 12 is extendable and contractible in the direction of vehicle width, that is, left and right, in response to rotation of the rotor (not shown) of a motor provided within the actuator. An end of each of the drive rods 12 is connected to a tie rod 13 which in turn is connected to one of the wheels 5. The tie rod 13 moves in connection with the drive rod 12, whereby the wheel 5 can be steered. In FIG. 1, the front left wheel 5 and rear right wheel 5 are steered rightward by the extension of the drive rod 12 and steered leftward by the contraction of the drive rod 12. On the other hand, the front right wheel 5 and rear left wheel 5 steer in the opposite directions when their drive rod 12 is extended and contracted.

Figure 2:
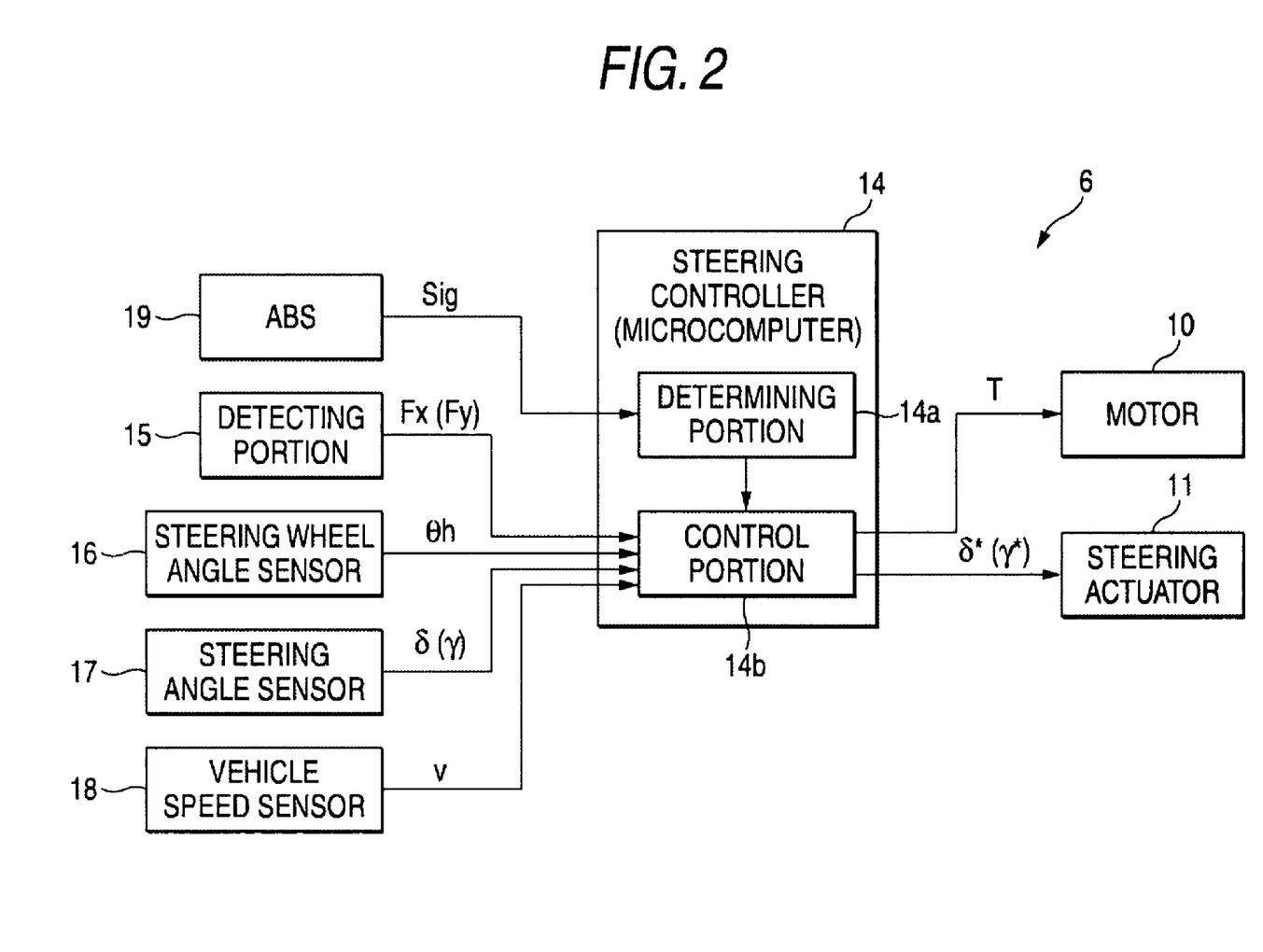

FIG. 2 is a block construction diagram showing a steering controller. Operations of the motor 10 and the steering actuators 11 are controlled by a steering controller 14. Detection signals from sensors 15 to 18 are input to the steering controller 14 in order to control operation of the wheel to be controlled.

Figure 3:
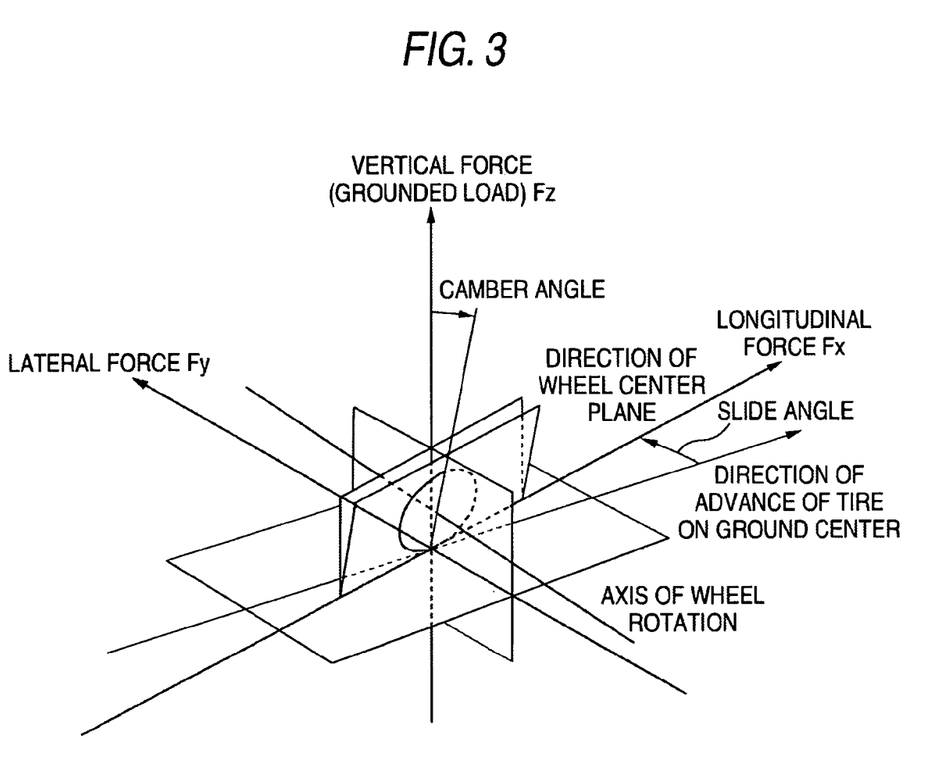

FIG. 3 is an explanatory diagram of tire forces. A detecting portion 15 is a sensor for detecting an tire force that acts on the wheel 5 and is provided in each of the wheels 5, front and rear, left and right. Though the tire forces detected by the detecting portion 15 may include a longitudinal force Fx, a lateral force Fy and a vertical force Fz, the longitudinal force Fx and lateral force Fy are important in this embodiment. The longitudinal force Fx is the component of a frictional force occurring on the ground surface of the vehicle 5 which is in parallel with the wheel center plane, and the lateral force Fy is the component perpendicular to the wheel center plane. Each of the detecting portions 15 processes a distortion gauge and an electric signal output from the distortion gauge and chiefly comprises a signal processing circuit that creates a detection signal in accordance with an tire force. The tire force is directly detected from the distortion gauge buried in the axle 4 based on the fact that stress occurring in the axle 4 is proportional to the tire force. For specific constructions of the detecting portions 15, refer to JP-A-04-331336 and JP-A-10-318862 if necessary.

A steering wheel angle sensor 16 is attached to the steering input axis 8 and detects the steering wheel angle θh (this may be the angle of rotation from the neutral position) of the steering wheel 7. A steering angle sensor 17 is attached to each of the steering actuators 11 and detects the angle of rotation of the rotor of the motor and thus detects the angle of steering of the respective wheels 5. A vehicle speed sensor 18 is a sensor for detecting a velocity v of the vehicle. An operation signal Sig is input from an ABS 19 (which is not shown in FIG. 1) to the steering controller 14 when the anti-lock brake is operated by the ABS 19.

The microcomputer serving as the steering controller 14 comprises a judgment portion 14a and a control portion 14b. The judgment portion 14a determines whether vehicle braking is to be permitted or not based on the driving state of the vehicle. The control portion 14b controls the steering reaction force T to be applied to the steering wheel 7 by controlling the motor 10 in accordance with the steering wheel angle θh. In addition, the control portion 14b controls the angle of steering of each of the wheels 5 by controlling the respective actuator 11. Normally, the control portion 14b defines the angle of steering of the left and right front wheels 5 to be in the right phase based on the steering wheel angle θh and defines the angle of steering of the left and right rear wheels 5 to be in the right phase (normal control). However, under conditions where the vehicle braking is permitted by the judgment portion 14a, the control portion 14b defines the angle of steering of the left and right front wheels 5 to be in opposite phases and adjustably defines their angles of steering in accordance with braking forces to be applied to the wheels 5. Furthermore, the control portion 14b defines the angles of steering of the left and right rear wheels 5 to be in opposite phases and adjustably defines their angles of steering in accordance with braking forces to be applied to the wheels 5. The expression, "same phase" herein refers to the angles of steering (angle of wheel) being the same direction with regard to the vehicle traveling direction, while the expression, "opposite phase" herein refers to the angles of wheels being in the opposite directions with regard to the vehicle traveling direction. The arrangement of angles of wheels does not have to agree strictly. The angle of steering of the left and right front wheels 5 is shown as "δ" and the angle of the left and right rear wheels 5 is shown as "γ", where the leftward steering is defined as the positive value. For the opposite phase control, the direction of steering of each of the wheels 5 is selected to have a toe-in or toe-out orientation, since the left and right wheels 5 have angles of steering with the sign reversed. In this case, "δ" and "γ" are gradients (absolute values) of the wheels with reference to the direction of advance.

Figure 4:
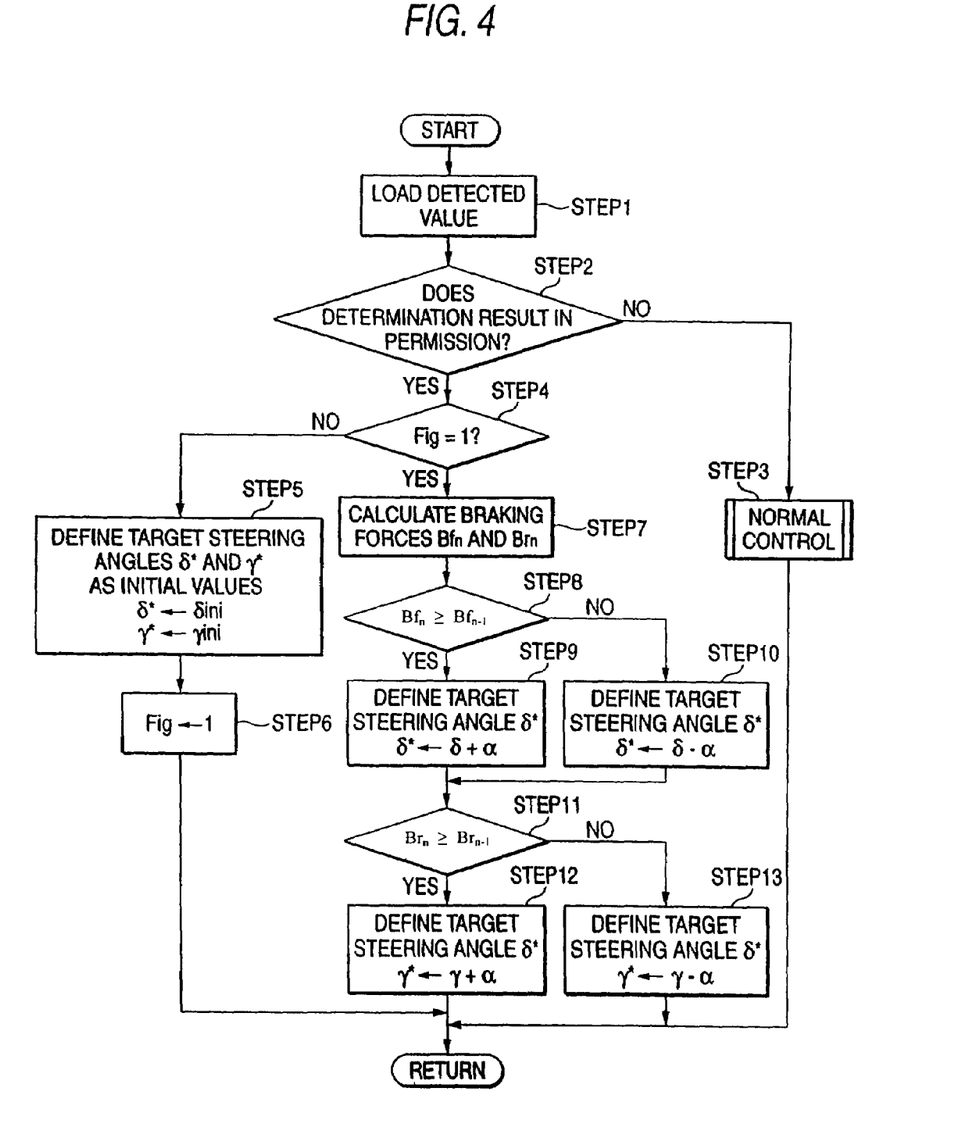

FIG. 4 is a flowchart illustrating a steering control routine according to this embodiment. This routine is processed at predetermined intervals and is implemented by the steering controller 14. First of all, in step 1, detection values are loaded. The detection values loaded in step S1 may include a steering wheel angle θh, angles of steering δ and γ of the left and right front and rear wheels 5 and a longitudinal force Fx and vertical force Fz acting on the wheels 5. Subscripts fl, fr, rl and rr refer to specific wheels (that is, left front wheel, right front wheel, left rear wheel and right rear wheel) 5 on which the tire forces act. Subscripts x and y following underlines specifically refer to directions of components (longitudinal and lateral) in which the tire forces act. For example, Ffl_x refers to the longitudinal force Fx acting on the front left wheel 5.

In step S2, whether vehicle braking by the steering device 6 is to be permitted or not is determined. Giving permission for vehicle braking may be determined based on the driving state of the vehicle and, according to this embodiment, is determined based on the operation state of the ABS 19. More specifically, when the anti-lock brake operates, the determination is made to "permit vehicle braking". When the anti-lock brake does not operate, the determination is made to "not permit vehicle braking". Whether the anti-lock brake operates or not may be determined based on the presence of the operation signal Sig output from the ABS 19. If the operation signal Sig is not output from the ABS 19, the routine moves to step 3 based on the negative determination result in step 2. On the other hand, when the operation signal Sig is output from the ABS 19, the routine moves to step 4 based on the positive determination result in step 2.

In step 3, after the following normal control over vehicle steering is performed, the routine exits. Under the normal control, target angles of steering $\delta^*$ and $\gamma^*$ of the front and rear wheels 5 under control are first calculated based on the detected steering wheel angle $\theta h$. Then, control values of the steering actuators 11 for achieving the target angles of steering $\delta^*$ and $\gamma^*$ are calculated based on the detected current angles of steering $\delta$ and $\gamma$. These calculated control values are output to the respective steering actuators 11, whereby the steering actuators 11 operate in accordance with the control values. In this case, the front and rear left and right wheels 5 are controlled to be in the same phase, and the front wheels 5 are adjusted to the target angle of steering $\delta^*$ and the rear wheels 5 are adjusted to the target angle of steering $\gamma^*$. The torque coefficient corresponding to the velocity v is determined with reference to a coefficient table previously created through experiments and/or simulations. Based on the determined torque coefficient and the detected steering wheel angle $\theta h$, the steering reaction force T to be created is calculated, and the control values in accordance with this steering reaction force T are calculated. The calculated control values are output to the motor 10, and the motor 10 operates in accordance with the control values, whereby the steering reaction force corresponding to the steering wheel angle is applied to the steering wheel 7.

In step 4, whether the determination flag Flg is "1" or not is determined. The determination flag Flg is set at "0" by the initial routine executed upon start of the vehicle or upon implementation of the normal control in step 3. The determination flag Flg "1" means that the vehicle braking by the steering device 6 is to be continuously performed. If the determination in step 4 has a negative result, that is, when the vehicle braking by the steering device 6 is not to be performed, the routine moves to step 5. On the other hand, when the determination flag Flg is changed from "0" to "1" once in a certain timing, the routine moves to step 7, which will be described later, in accordance with the positive result of the determination in step 4.

In step 5, the target angles of steering $\delta^*$ and $\gamma^*$ of the front and rear wheels 5 are defined to the initial values $\delta$ini and $\gamma$ini (which are predetermined values of Toe-in). Then, in step 6 following step 5, the determination flag Flg is set to "1", and then the routine exits. In this case, the left and right wheels 5 are controlled to be in opposite phase, whereby the front wheels 5 are adjusted to the target angle of steering $\delta^*$, and the rear wheels 5 are adjusted to the target angle of steering $\gamma^*$. When the initial values $\delta$ini and $\gamma$ini in step 5 are defined to larger values, the toe angle becomes steep. Therefore, optimum values resulting from experiments and simulations are defined as the initial values $\delta$ini and $\gamma$ini.

On the other hand, in step 7, the braking force Bf being applied to the left and right front wheels 5 and the braking force Br being applied to the left and right rear wheels 5 are calculated. These braking forces Bf and Br can be uniquely estimated based on the longitudinal force Fx and lateral force Fy and the angles of wheels $\delta$ and $\gamma$ (see EQ1 below).

$$Bf=(Ffr\_y-Ffl\_y)\sin\delta-(Ffl\_x+Ffr\_x)\cos\delta$$

$$Br=(Frr\_y-Frl\_y)\sin\gamma-(Frl\_x+Frr\_x)\cos\gamma \quad [EQ1]$$

In step 8, the current value of the braking force Bf (denoted $Bf_n$) being applied to the left and right front wheels 5 and the previous (such as 100 msec before) braking force $Bf_{n-1}$ are compared, and whether the current braking force $Bf_n$ is equal to or larger than the previous braking force $Bf_{n-1}$ or not is determined. If the determination in step 8 is positive, that is, when the current braking force $Bf_n$ is equal to or larger than the previous braking force $Bf_{n-1}$ ($Bf_n \geq Bf_{n-1}$), the routine moves to step 9. Then, the target angle of steering $\delta^*$ of the left and right front wheels 5 is set to be the sum of a predetermined step value $\alpha$ and the current angle of steering $\delta$ (absolute value) (step 9). Thus, when the angle of steering $\delta$ of the left and right front wheels 5 is defined larger than the current value, the Toe-in of the front wheels 5 becomes greater. Therefore, the braking force Bf gets closer to the maximum value. On the other hand, if the determination in step 8 is negative, that is, when the current braking force $Bf_n$ is smaller than the previous braking force $Bf_{n-1}$ ($Bf_n < Bf_{n-1}$), the routine moves to step 10. Then, the target angle of steering $\delta^*$ of the front wheels 5 is set at the value resulting from the subtraction of the predetermined step value $\alpha$ from the current angle of steering $\delta$ (absolute value) (step 10). Thus, when the angle of steering $\delta$ of the left and right front wheels 5 set to be smaller than the current value, the Toe-in of the front wheels 5 is reduced. Therefore, the braking force Bf gets closer to the maximum value.

In step 11, the current value of the braking force Br (denoted $Br_n$) to be applied to the left and right rear wheels 5 and the previous (such as 100 msec before) braking force $Br_{n-1}$ are compared, and whether the current braking force $Br_n$ is equal to or larger than the previous braking force $Br_{n-1}$ or not is determined. If the determination in step 11 is positive, that is, when the current braking force $Br_n$ is equal to or larger than the previous braking force $Br_{n-1}$ ($Br_n \geq Br_{n-1}$), the routine moves to step 12. Then, the target angle of steering $\gamma^*$ of the rear wheels 5 is set to the sum of a predetermined step value $\alpha$ and the current angle of steering $\gamma$ (absolute value) (step 12). Thus, when the angle of steering $\gamma$ of the left and right rear wheels 5 is set larger than the current value, the Toe-in of the rear wheels 5 is increased. Therefore, the braking force Br acts in a direction closer to the maximum value. On the other hand, if the determination in step 11 is negative, that is, when the current braking force $Br_n$ is smaller than the previous braking force $Br_{n-1}$ ($Br_n < Br_{n-1}$), the routine moves to step 13. Then, the target angle of steering $\gamma^*$ of the rear wheels 5 is defined to the value resulting from the subtraction of the predetermined step value $\alpha$ from the current angle of steering $\gamma$ (absolute value) (step 13). Thus, when the angle of steering $\gamma$ of the left and right rear wheels 5 is set to be smaller than the current value, the Toe-in of the rear wheels 5 is decreased. Therefore, the braking force Br acts in a direction closer to the maximum value.

In this way, according to this embodiment, the left and right wheels 5 are put in opposite phase when the anti-lock brake operates as the driving state of the vehicle. Thus, longitudinal component (as opposed to the lateral force Y) serving as the braking force B is applied to the left and right wheels 5, and also a resistive force R serving as the braking force B due to the wheels 5 being buried in a road is applied to the left and right wheels 5 (see EQ2).

$$B=(Yfr+Yfl)\sin\delta+(Yrr+Yrl)\sin\gamma+R \quad [EQ2]$$

The lateral force Y in EQ2 refers to the lateral force normally caused by the wheels 5 with a slide angle, and the lateral force Fy detected by the detecting portion 15 is a value resulting from the addition of a component of the resistive force R to the lateral force Y. Therefore, a relationship between the lateral force Fy which is a detection value and the braking force B can be expressed by:

$$B = (Ffr\_y + Ffl\_y)\sin\delta + (Frr\_y + Frl\_y)\sin\gamma \quad [EQ3]$$

For example, the operation of the ABS disadvantageously increases the braking distance and/or braking time on a road such as a graveled road. However, according to this embodiment, the control of the wheels 5 in opposite phase additionally gives the braking force B by the steering device 6 in addition to the braking force by a normal brake. The braking force is increased by the wheels 5 being buried in a road such as a graveled road, which can reduce the braking distance and/or braking time. Furthermore, according to this embodiment, the braking forces Bfn and Brn are monitored, and the angles of steering $\delta$ and $\gamma$ are controlled such that the values can be maximum. Thus, the braking force B can be effectively applied to the wheels 5, which advantageously reduces the braking distance and/or braking time.

Second Embodiment

A second embodiment is different from the first embodiment with respect to the driving state in which the vehicle braking is permitted by the judgment portion 14a. Here, only differences between the embodiments will be described, since the system construction and system processing in the braking device according to the second embodiment are basically identical to those of the first embodiment. According to the first embodiment, the operation of the anti-lock brake is a requirement for permitting vehicle braking since the main object is to reduce braking distance and/or braking time on a graveled road, for example. On the other hand, the main object of this embodiment is emergency braking when a brake has a failure, and thus a failure in the ABS 19 is a condition for permitting vehicle braking. Therefore, a signal indicating a problem (failure and/or impaired function) is input from the ABS 19 to the steering controller 14. The signal may be a diagnosis code to be output from a control unit that controls the ABS 19, for example. The diagnosis code may be a signal indicating the problem state, output when a problem is recognized by a diagnosis program which identifies a problem in a part under the control of the control unit. Therefore, according to this embodiment the determination in the processing in step 2 shown in FIG. 4 results in "permit vehicle braking" when a predetermined diagnosis code is input.

According to this embodiment, the driving state of the vehicle in which the angles of steering of the left and right wheels 5 are put in opposite phase is the failure of ABS 19. Thus, the longitudinal component of the lateral force Fy serving as a braking force B is applied to each of the wheels 5, and a resistive force R, serving as a braking force B, caused by the wheels 5 being buried in a road is applied to each of the wheels 5. Thus, the braking force B can be applied to the wheels 5 in a different manner from that of a normal brake, whereby the vehicle can be effectively stopped.

Furthermore, according to this embodiment, the braking forces $Bf_n$ and $Br_n$ are monitored, and the angles of steering $\delta$ and $\gamma$ of the left and right wheels 5 are controlled such that the braking forces can be maximum. Therefore, the wheel braking can be performed effectively, and the reduction of the braking distance and/or braking time can be achieved.

According to the first or second embodiment, the braking forces Bf and Br on the front wheel side and rear wheel side are estimated based on the longitudinal force Fx and lateral force Fy and the angles of wheels (angles of steering) $\delta$ and $\gamma$ of the left and right wheels 5, and the steering control is performed such that the braking forces Bf and Br can be maximum. However, the invention is not limited thereto, and various changes may be made. For example, the friction circle, that is, the resultant of the longitudinal force Fx and the vertical force Fz ($(Fx^2 + Fz^2)^{1/2}$) may be estimated as the braking force B based on the fact that the braking force B is correlated with the size of the friction circle, and the steering control may be performed so that the friction circle can is maximum. Alternatively, the deceleration of the vehicle may be estimated from a braking force B based on the fact that the braking force B is correlated with the deceleration, and the steering control may be performed so that the deceleration can be maximum. The deceleration of the vehicle may be detected by a well known acceleration sensor or may be obtained by calculating change of velocity per unit time (acceleration) detected by the vehicle speed sensor 18. In this case, the steering device 6 includes an acceleration sensor instead of the detecting portion 15, and the detection value is input to the steering controller 14. It is sufficient that the detecting portion 15 is omitted in order to obtain the deceleration based on a velocity v. The same advantages as those of the first and second embodiments can be obtained even with the methods using friction circle or deceleration. The braking force B can be estimated with high accuracy since the longitudinal force Fx and lateral force Fy acting on the wheels 5 can be directly detected by the method using the detecting portion 15. Therefore, the braking control can be advantageously performed with high accuracy.

Though the detecting portion 15 is configured to detect tire forces which act in three directions according to the first or second embodiment, the invention is not limited thereto. The detecting portion 15 need only be capable of detecting an tire force that acts in a required direction component. The detecting portion 15 may be a six-component force measuring device which detects six components including not only components of a force in three directions but also moments in the three directions. Naturally, no problem occurs since the tire force requiring estimation can be detected even under this construction. For a method of detecting six components of the force acting on the wheels 5, refer to JP-A-2002-039744 and/or JP-2002-022579 if necessary.

Though the case in which the detecting portion 15 is provided within the wheel axle 4 was described, the invention is not limited thereto. Other variations may be implemented. In order to detect an tire force, the detecting portion 15 may be provided in a member that holds the wheel 5, such as a hub and a hub carrier. For a method for providing the detecting portion 15 in a hub, refer to JP-A-2003-104139, for example, if necessary.

Though the left and right wheels 5 are set in opposite phase so as to have the toe-in alignment according to this embodiment, the invention is not limited thereto. The control may be performed so as to be Toe-out. The method can also provide the same advantages as those of the embodiments above. However, when the wheels 5 are controlled so as to be Toe-out, pebbles on a road may be piled up by the wheels 5, which may raise the vehicle. Since re-driving after stopping may be difficult in this case, the left and right wheels 5 are preferably controlled so as to be Toe-in. Furthermore, the control of the wheel angle is not limited to the one with the steering device 6, but a mechanism can be adopted which can control the angle of the wheels 5 with respect to the direction of advance of the vehicle. For a mechanism for controlling the angle of Toe-in, refer to JP-A-06-312613 and/or JP-10-218008, for example, if necessary. The control of the angle of wheels need not be performed on both the front pair and rear pair of wheels but can be only the front pair or only the rear pair of wheels 5, putting one pair in opposite phase.

What is claimed is:

1. A vehicle steering apparatus comprising:
   a driving state detecting device for detecting a driving state of the vehicle;
   a wheel adjusting device for adjusting separately the wheel angles of left and right wheels;
   a braking force estimating device for estimating braking force to be applied to the left and right wheels periodically;
   a judgment portion for determining whether vehicle braking is to be permitted or not based on the driving state of the vehicle; and
   a control portion controlling the wheel adjusting device,
   wherein, in the case that vehicle braking is permitted by the judgment portion, the control portion sets the wheel angles of the left and right wheels to be in opposite phase and adjusts the wheel angles in accordance with the braking force to be applied to the left and right wheels, and
   said control portion sets
   first target wheel angles of the left and right wheels to be the sum of a predetermined step value and current wheel angles when a current braking force is larger than a previous braking force or
   second target wheel angles of the left and right wheels to be the subtraction of a predetermined step value from the current wheel angles when the current braking force is smaller than the previous braking force.

2. The vehicle steering apparatus according to claim 1, wherein the control portion sets the wheel angles to be larger than the current value if the current braking force to be applied is larger than the previous braking force, and sets the wheel angles to be smaller than the current value if the current braking force to be applied is smaller than the previous braking force.

3. The vehicle steering apparatus according to claim 1, further comprising:
   a detecting portion which detects the deceleration of the vehicle, wherein the control portion estimates the braking force based on the deceleration of the vehicle.

4. The vehicle steering apparatus according to claim 1, further comprising:
   a detecting portion which directly detects the longitudinal force and lateral force acting on the wheels, wherein the control portion estimates the braking force based on the size of the circle of friction of the wheels calculated from the longitudinal force and lateral force.

5. The vehicle steering apparatus according to claim 1, further comprising:
   a detecting portion which directly detects the longitudinal force and lateral force acting on the wheels, wherein the control portion estimates the braking force based on the longitudinal force, lateral force and angle of wheels.

6. The vehicle steering apparatus according to claim 1, wherein the control portion defines the angle of wheels so that the left and right wheels are in a toe-in orientation.

7. The vehicle steering apparatus according to claim 1, wherein the driving state detecting device detects an operation state of an anti-lock brake system and the judgment portion determines whether vehicle braking is to be permitted or not based on the operation state of the anti-lock braking system.

8. The vehicle steering apparatus according to claim 7, wherein the judgment portion permits the vehicle braking when the anti-lock brake system operates.

9. The vehicle apparatus according to claim 1, wherein the control portion sets target wheel angles based on whether the braking force is increasing or decreasing.

10. The vehicle apparatus according to claim 1, wherein the braking force estimating device estimates braking force to be applied to the left and right wheels periodically and
    the control portion sets target wheel angles based on a comparison a current braking force with a previous braking force.

11. The vehicle apparatus according to claim 1, wherein the control portion makes a determination during vehicle braking is permitted by the judgment portion that a current braking force value is equal, higher or lower than a previous braking force value and
    sets target wheel angles of the left and right wheels based on the determination.

12. The vehicle apparatus according to claim 1, wherein said control portion sets
    the first target wheel angles of the left and right wheels to be the sum of the predetermined step value and the current wheel angles when the current braking force is equal or larger than the previous braking force.

13. The vehicle steering apparatus according to claim 1, further comprising a detecting portion which detects friction forces acting on the wheels and said braking force estimating device estimates braking force periodically based on detected friction forces during a vehicle braking action.

14. A vehicle steering method comprising:
    a first step of determining whether vehicle braking is to be permitted or not based on a driving state of the vehicle;
    a second step of estimating braking force to be applied to left and right wheels periodically; and
    a third step of controlling the wheel angles of the left and right wheels, wherein, in the case that the vehicle braking is permitted, the third step sets the wheel angles of the left and right wheels to be in opposite phase and adjusts the wheel angles in accordance with the braking force to be applied to the left and right wheels, and
    said third step sets
    first target wheel angles of the left and right wheels to be the sum of a predetermined step value and current wheel angles when a current braking force is larger than a previous braking force or
    second target wheel angles of the left and right wheels to be the subtraction of a predetermined step value from the current wheel angles when the current braking force is smaller than the previous braking force.

15. The vehicle steering method according to claim 14, wherein the third step sets the wheel angles to be larger than the current angles if the current braking force to be applied is equal to or larger than the previous braking force and sets the wheel angles to be smaller than the current value if the current braking force to be applied is smaller than the previous braking force.

16. The vehicle steering method according to claim 14, wherein the braking force is estimated based on the deceleration of the vehicle.

17. The vehicle steering method according to claim 14, wherein the braking force is estimated based on the size of the circle of friction of the wheels calculated from a longitudinal force and lateral force acting on the wheels.

18. The vehicle steering method according to claim 14, further comprising:
wherein the braking force is estimated based on a longitudinal force acting on the wheels, lateral force acting on the wheels and angle of wheels.

19. The vehicle steering method according to claim 14,
wherein the angle of wheels is set in the third step as that the left and right wheels are in a toe-in orientation.

20. The vehicle method according to claim 14,
wherein the first step determines whether vehicle braking is to be permitted or not based on a operation state of an anti-lock braking system.

21. The vehicle method according to claim 20,
wherein the first step permits vehicle braking when the anti-lock braking system operates.

* * * * *